United States Patent
Dubois et al.

(10) Patent No.: US 10,480,571 B2
(45) Date of Patent: Nov. 19, 2019

(54) SELF LOCKING BEARING PRELOAD ADJUSTER

(71) Applicant: The Hive Global, Inc., Taichung (TW)

(72) Inventors: George Dubois, San Luis Obispo, CA (US); Matt O'Rourke, Portland, OR (US)

(73) Assignee: The Hive Global, Inc, Taichung (TW)

( * ) Notice: Subject to any disclaimer, the term of this patent is extended or adjusted under 35 U.S.C. 154(b) by 0 days.

(21) Appl. No.: 16/250,593

(22) Filed: Jan. 17, 2019

(65) Prior Publication Data

US 2019/0154083 A1 May 23, 2019

Related U.S. Application Data

(62) Division of application No. 14/099,641, filed on Dec. 6, 2013, now Pat. No. 10,221,887.

(60) Provisional application No. 61/734,065, filed on Dec. 6, 2012.

(51) Int. Cl.
*F16C 25/06* (2006.01)
*B62M 3/00* (2006.01)

(52) U.S. Cl.
CPC ............ *F16C 25/06* (2013.01); *B62M 3/003* (2013.01); *F16C 2326/28* (2013.01); *Y10T 29/49696* (2015.01); *Y10T 74/2165* (2015.01)

(58) Field of Classification Search
CPC ......... B62B 3/003; F16C 25/06; B62K 19/34; Y10T 74/2164; Y10T 74/2165
See application file for complete search history.

(56) References Cited

U.S. PATENT DOCUMENTS

| | | |
|---|---|---|
| 512,729 A | 1/1894 | Lucas |
| 527,384 A | 10/1894 | Davids |
| 527,520 A | 10/1894 | Copeland |
| 547,639 A | 10/1895 | Grubb |
| 575,712 A | 1/1897 | Hamilton |
| 576,548 A | 2/1897 | Cassidy |
| 579,479 A | 3/1897 | Gobbler |
| 590,685 A | 9/1897 | Matthews |

(Continued)

FOREIGN PATENT DOCUMENTS

| | | |
|---|---|---|
| CN | 108700123 A | 10/2018 |
| DE | 19751879 A1 | 5/1999 |

(Continued)

OTHER PUBLICATIONS

Machine translation of DE 19751879 obtained on Dec. 6, 2018.

(Continued)

*Primary Examiner* — Richard W Ridley
*Assistant Examiner* — Brian J McGovern
(74) *Attorney, Agent, or Firm* — Haverstock & Owens LLP

(57) ABSTRACT

A bearing preload adjuster for a bicycle crank set and bottom bracket comprises an adjustment ring for coupling with a bicycle crank arm, a movable plunger comprising an external thread for rotatably coupling with the adjustment ring. The adjustment ring is rotated in order to cause the plunger to extend along an axis of the bottom bracket and apply pressure to a bottom bracket bearing inner race. The adjustment ring is rotated until the clearance in the bearing assemblies and the play in the bottom bracket assembly has been eliminated. This allows the crank assembly to rotate freely, while preventing the crank assembly from sliding side to side inside the bearing bores and along the axis of the crank spindle.

4 Claims, 8 Drawing Sheets

(56) References Cited

U.S. PATENT DOCUMENTS

| | | |
|---|---|---|
| 595,388 A | 12/1897 | Hanson |
| 598,325 A | 2/1898 | McIntyre |
| 614,900 A | 11/1898 | Seaver |
| 616,167 A | 12/1898 | Walker |
| 620,266 A | 2/1899 | Woodiska |
| 666,679 A | 1/1901 | Kraus |
| 1,070,971 A | 8/1913 | Lowd |
| 1,325,206 A | 12/1919 | Raybon |
| 1,400,131 A | 12/1921 | Adams |
| 1,535,601 A | 4/1925 | Graham |
| 1,636,327 A | 7/1927 | Roe |
| 2,015,430 A | 9/1935 | Matthews |
| 2,024,499 A | 12/1935 | Baron |
| 2,228,770 A | 1/1941 | Le Tourneau |
| 2,317,070 A | 4/1943 | Le Tourneau |
| 2,567,785 A | 9/1951 | Rieger |
| 2,568,443 A | 9/1951 | Gemer |
| 2,751,797 A | 6/1956 | Pearl |
| 3,184,993 A | 5/1965 | Swenson |
| 3,185,439 A | 5/1965 | Inaba et al. |
| 3,303,720 A | 2/1967 | Jaulmes |
| D208,683 S | 9/1967 | Schreckengost |
| 3,382,734 A | 5/1968 | Hussey |
| 3,416,385 A | 12/1968 | Schenk |
| 3,477,303 A | 11/1969 | Brilando |
| 3,485,113 A | 12/1969 | Adcock |
| 3,592,076 A | 7/1971 | Baginski |
| 3,760,653 A | 9/1973 | Hagenah |
| 3,785,129 A | 1/1974 | Anthamatten |
| 3,807,255 A | 4/1974 | Baginski |
| 3,811,339 A | 5/1974 | Konzorr |
| 3,869,138 A | 3/1975 | Allison |
| 3,910,136 A | 10/1975 | Juy |
| 3,964,343 A | 6/1976 | Lauterbach |
| 3,973,447 A | 8/1976 | Nagano |
| 4,016,357 A | 4/1977 | Abrahamsen |
| 4,044,621 A | 8/1977 | McGregor, Sr. |
| 4,078,444 A | 3/1978 | Huret |
| 4,089,236 A | 5/1978 | Genzling |
| 4,093,325 A | 6/1978 | Troccaz |
| 4,135,727 A | 1/1979 | Camagnolo |
| 4,237,743 A | 12/1980 | Nagano |
| 4,240,303 A | 12/1980 | Mosley |
| 4,269,084 A | 5/1981 | Okajima |
| 4,298,210 A | 11/1981 | Lotteau |
| 4,302,987 A | 12/1981 | Takeda |
| 4,330,137 A | 5/1982 | Nagano |
| 4,337,933 A | 7/1982 | Egami |
| 4,377,952 A | 3/1983 | Gamondes |
| 4,398,434 A | 8/1983 | Kimura |
| 4,433,963 A | 2/1984 | Shimano |
| 4,439,172 A | 3/1984 | Segawa |
| 4,441,383 A | 4/1984 | Segawa |
| 4,442,732 A | 4/1984 | Okajima |
| 4,445,289 A | 5/1984 | Beneteau |
| 4,445,397 A | 5/1984 | Shimano |
| 4,472,163 A | 9/1984 | Bottini |
| 4,475,894 A | 10/1984 | Sugino |
| 4,487,424 A | 12/1984 | Ellis |
| 4,488,453 A | 12/1984 | Drugeon |
| 4,498,890 A | 2/1985 | Sutherland |
| 4,506,463 A | 3/1985 | Chassing |
| 4,507,105 A | 3/1985 | Stottmann |
| 4,515,386 A | 5/1985 | Tsujimura |
| 4,523,492 A | 6/1985 | Shimano |
| 4,538,480 A | 9/1985 | Trindle |
| 4,573,950 A | 3/1986 | Nagano |
| 4,608,878 A | 9/1986 | Shimano |
| 4,632,416 A | 12/1986 | Zelenetz |
| 4,639,240 A | 1/1987 | Liu |
| 4,640,151 A | 2/1987 | Howell |
| 4,646,586 A | 3/1987 | Raposarda |
| 4,662,862 A | 5/1987 | Matson |
| 4,665,767 A | 5/1987 | Lassche |
| 4,686,867 A | 8/1987 | Bernard |
| 4,704,919 A | 11/1987 | Durham |
| 4,735,107 A | 4/1988 | Winkle |
| D298,613 S | 11/1988 | McMurtey |
| 4,791,692 A | 12/1988 | Collins |
| 4,803,894 A | 2/1989 | Howell |
| 4,815,333 A | 3/1989 | Sampson |
| 4,827,633 A | 5/1989 | Feldstein |
| 4,832,667 A | 5/1989 | Wren |
| 4,838,115 A | 6/1989 | Nagano |
| 4,840,085 A | 6/1989 | Nagano |
| 4,854,924 A | 8/1989 | Nagano |
| 4,873,890 A | 10/1989 | Nagano |
| 4,882,946 A | 11/1989 | Beyl |
| 4,893,523 A | 1/1990 | Lennon |
| 4,898,063 A | 2/1990 | Sampson |
| 4,905,541 A | 3/1990 | Alan |
| 4,923,324 A | 5/1990 | Favrou |
| 4,928,549 A | 5/1990 | Nagano |
| 4,932,287 A | 6/1990 | Ramos |
| 4,947,708 A | 8/1990 | Lacomb |
| 5,002,520 A | 3/1991 | Greenlaw |
| 5,003,841 A | 4/1991 | Nagano |
| 5,014,571 A | 5/1991 | Dapezi |
| 5,018,564 A | 5/1991 | Anglin |
| 5,046,382 A | 9/1991 | Steinberg |
| 5,048,369 A | 9/1991 | Chen |
| 5,060,537 A | 10/1991 | Nagano |
| 5,067,930 A | 11/1991 | Morales |
| D323,309 S | 1/1992 | Perry |
| 5,115,692 A | 5/1992 | Nagano |
| 5,121,935 A | 6/1992 | Mathieu et al. |
| 5,195,397 A | 3/1993 | Nagano |
| 5,203,229 A | 4/1993 | Chen |
| 5,207,768 A | 5/1993 | Gluys |
| 5,209,581 A | 5/1993 | Nagano |
| 5,259,270 A | 11/1993 | Lin |
| 5,320,582 A | 6/1994 | Takeda |
| 5,326,331 A | 7/1994 | Hallock, III |
| 5,379,665 A | 1/1995 | Nagano |
| D355,872 S | 2/1995 | Haney |
| 5,419,218 A | 5/1995 | Romano |
| 5,423,233 A | 6/1995 | Peyre |
| 5,460,576 A | 10/1995 | Barnett |
| 5,496,222 A | 3/1996 | Kojima |
| 5,497,680 A | 3/1996 | Nagano |
| 5,505,111 A | 4/1996 | Nagano |
| 5,522,282 A | 6/1996 | Nagano |
| 5,540,118 A | 7/1996 | Calendrille, Jr. |
| 5,549,396 A | 8/1996 | Chiang |
| 5,620,384 A | 4/1997 | Kojima |
| 5,626,060 A | 5/1997 | Lin |
| 5,676,616 A | 10/1997 | Hara |
| 5,679,084 A | 10/1997 | Daniels, III |
| 5,687,619 A | 11/1997 | Bryne |
| 5,725,450 A | 3/1998 | Huskey |
| 5,727,429 A | 3/1998 | Ueda |
| 5,728,018 A | 3/1998 | Terada |
| 5,765,450 A | 6/1998 | Kruger |
| 5,771,757 A | 6/1998 | Hanamura |
| 5,782,714 A | 7/1998 | Osgood |
| 5,806,379 A | 9/1998 | Nagano |
| 5,809,844 A | 9/1998 | Durham |
| 5,846,148 A | 12/1998 | Fuji |
| 5,927,155 A | 7/1999 | Jackson |
| 5,943,795 A | 8/1999 | Ueda |
| 6,003,889 A | 12/1999 | Shalom |
| 6,014,914 A | 1/2000 | Ueda |
| 6,039,665 A | 3/2000 | Nakamura |
| 6,059,378 A | 5/2000 | Dougherty |
| 6,060,982 A | 5/2000 | Holtrop |
| 6,083,132 A | 7/2000 | Walker |
| 6,117,032 A | 9/2000 | Nankou |
| 6,165,092 A | 12/2000 | Bramham |
| 6,203,459 B1 | 3/2001 | Calendrille, Jr. |
| 6,264,575 B1 | 7/2001 | Lim |
| 6,332,853 B1 | 12/2001 | Bowman |
| 6,354,973 B1 | 3/2002 | Barnett |
| 6,416,434 B1 | 7/2002 | Calendrille, Jr. |
| 6,490,948 B2 | 12/2002 | Tanaka |

(56) References Cited

U.S. PATENT DOCUMENTS

| | | |
|---|---|---|
| 6,520,048 B2 | 2/2003 | Chen |
| 6,533,690 B2 | 3/2003 | Barnett |
| 6,612,201 B1 | 9/2003 | Chen |
| 6,647,826 B2 | 11/2003 | Okajima |
| 6,725,742 B2 | 4/2004 | Bremer |
| 6,729,204 B1 | 5/2004 | Chen |
| 6,988,427 B2 | 1/2006 | Yamanaka |
| 7,013,754 B2 | 3/2006 | Milanowski |
| 7,024,961 B2 | 4/2006 | Hsiao |
| D522,414 S | 6/2006 | Chen |
| 7,059,983 B2 | 6/2006 | Heim |
| 7,066,856 B1 | 6/2006 | Rogers |
| 7,066,857 B1 | 6/2006 | DeRosa |
| D524,195 S | 7/2006 | Neal |
| 7,108,428 B2 | 9/2006 | Ason |
| 7,174,807 B2 | 2/2007 | Bryne |
| 7,240,587 B2 | 7/2007 | Plassiard |
| 7,334,500 B2 | 2/2008 | Tseng |
| 7,523,685 B2 | 4/2009 | French |
| 7,562,604 B2 | 7/2009 | Fukui |
| 7,650,817 B2 | 1/2010 | Shiraishi et al. |
| 7,886,947 B2 | 2/2011 | Campagnolo |
| 8,025,304 B2 | 9/2011 | Smith |
| 8,235,849 B2 | 8/2012 | Carnston et al. |
| 8,413,769 B2 | 4/2013 | Thrash |
| 8,491,429 B2 | 7/2013 | Cranston et al. |
| 8,561,500 B2 | 10/2013 | D'Aluisio |
| 8,641,151 B2 | 2/2014 | Kamada |
| 8,979,685 B2 | 3/2015 | Weagle |
| 9,003,921 B2 | 4/2015 | Weagle |
| 9,458,871 B2 | 10/2016 | Ishizaki |
| 2002/0028719 A1 | 3/2002 | Yamanaka |
| 2002/0160869 A1 | 10/2002 | Barnett |
| 2002/0170382 A1 | 11/2002 | Yang |
| 2002/0194951 A1 | 12/2002 | Lowe |
| 2003/0029271 A1 | 2/2003 | Shuman |
| 2003/0051576 A1 | 3/2003 | Muraoka |
| 2003/0064844 A1 | 4/2003 | Lin |
| 2003/0183036 A1 | 10/2003 | Chou |
| 2004/0009835 A1 | 1/2004 | Heim |
| 2004/0037628 A1 | 2/2004 | Meggiolan |
| 2004/0187635 A1 | 9/2004 | Bryne |
| 2004/0200314 A1 | 10/2004 | Hermansen et al. |
| 2004/0254038 A1 | 12/2004 | Chamberlain |
| 2005/0005729 A1 | 1/2005 | Chen |
| 2005/0081679 A1 | 4/2005 | Chen |
| 2005/0252337 A1 | 11/2005 | Chen |
| 2005/0284253 A1 | 12/2005 | Hervig |
| 2006/0029317 A1 | 2/2006 | Yamamoto |
| 2006/0081088 A1 | 4/2006 | Muraoka |
| 2006/0199690 A1 | 9/2006 | Gardner |
| 2006/0236809 A1 | 10/2006 | Bryne |
| 2006/0258499 A1 | 11/2006 | Kamada |
| 2006/0266154 A1 | 11/2006 | Hermansen |
| 2006/0288819 A1 | 12/2006 | Dal Pra' et al. |
| 2007/0034043 A1 | 2/2007 | Feltrin |
| 2007/0137432 A1 | 6/2007 | Chen |
| 2007/0182122 A1 | 8/2007 | Smith |
| 2007/0204720 A1 | 9/2007 | Poyzer |
| 2007/0235986 A1 | 10/2007 | Weagle |
| 2008/0152460 A1 | 6/2008 | Watanabe |
| 2008/0289927 A1 | 11/2008 | Ji |
| 2009/0042682 A1 | 2/2009 | Giuseppe Dal Pra |
| 2009/0078081 A1 | 3/2009 | French |
| 2009/0095122 A1 | 4/2009 | Weagle |
| 2010/0275724 A1 | 11/2010 | Staples et al. |
| 2010/0295265 A1 | 11/2010 | Burdick |
| 2011/0140390 A1 | 6/2011 | Kuroiwa et al. |
| 2012/0067675 A1 | 3/2012 | Thrash |
| 2012/0119565 A1 | 5/2012 | Kamada |
| 2012/0225745 A1 | 9/2012 | Oishi |
| 2012/0260767 A1 | 10/2012 | D'Aluisio |
| 2013/0053195 A1 | 2/2013 | Emura et al. |
| 2013/0053196 A1 | 2/2013 | Emura |
| 2013/0114999 A1 | 5/2013 | Ostling |
| 2013/0225343 A1 | 8/2013 | Spahr et al. |
| 2014/0157951 A1 | 6/2014 | Dubois |
| 2015/0024884 A1 | 1/2015 | Braedt |
| 2015/0210353 A1 | 7/2015 | Tokuyama et al. |
| 2016/0236749 A1 | 8/2016 | Cody |
| 2017/0057598 A1 | 3/2017 | Thrash et al. |
| 2017/0101124 A1 | 4/2017 | Assmann |
| 2017/0274960 A1 | 9/2017 | Dubois |

FOREIGN PATENT DOCUMENTS

| | | |
|---|---|---|
| DE | 102007028897 A1 | 1/2009 |
| DE | 102016002706 A1 | 9/2017 |
| DE | 10201621865 A1 | 12/2017 |
| EP | 0849155 A2 | 6/1998 |
| EP | 2441656 A1 | 4/2012 |
| EP | 3 109 062 A1 | 12/2015 |
| TW | 201718327 | 6/2017 |
| TW | 201739659 | 11/2017 |
| WO | 2017040047 A1 | 3/2017 |
| WO | 2017165226 A1 | 9/2017 |

OTHER PUBLICATIONS

International Search Report and Written Opinion from International Application No. PCT/US18/46952 dated Nov. 9, 2018.
Mountain Cycle Catalog 2000, www.MountainCycle.com.
Mountain Bike Action Magazine, Oct. 2000, pp. 38-40, www.mbaction.com.
Mountain Cycle Shockwave—Photos.
Mountain Bike Action Magazine 2000, p. 138, www.mbaction.com.
Mountain Cycle Universal Chainguide Instructions, www.mountaincycle.com.
2001 Gizmo Installation Instructions, web.archive.org/web/20011025172447/http://mrdirt.com/gizmo/page4.htm.
Mr.Dirt Gizmo Pictures.
2006 Race Face Interbike(Trade Show)Booth, www.bikemagic.com.
Raceface Diabolous Chainguide Instructions.
Decline Magazine, Issue 20, Article "Its the New Style", Jan. Feb. 2006.
Diabolus Chainguide actual Product Photos.
International Search Report from PCT/US2017/023016.
European Search Report dated Apr. 1, 2019 for European Application No. 16842566.8.

SELF LOCKING BEARING PRELOAD ADJUSTER

RELATED APPLICATIONS

This Patent Application a divisional of co-pending U.S. patent application Ser. No. 14/099,641, filed on Dec. 6, 2013, and entitled "A SELF LOCKING BEARING PRELOAD ADJUSTER" which claims priority under 35 U.S.C. 119(e) of the U.S. provisional patent application, Application No. 61/734,065, filed on Dec. 6, 2012, and entitled "SELF LOCKING BEARING PRELOAD ADJUSTER." The U.S. patent application Ser. No. 14/099,641, filed on Dec. 6, 2013, and entitled "A SELF LOCKING BEARING PRELOAD ADJUSTER" and the provisional application, Ser. No. 61/734,065, Dec. 6, 2012, and entitled "SELF LOCKING BEARING PRELOAD ADJUSTER" are hereby incorporated herein by reference in their entirety.

FIELD OF THE INVENTION

The present invention is generally directed to the field of bicycles and bicycle components. More specifically, the present invention is directed to a method and system for adjusting the bearing preload in a bicycle bottom bracket assembly.

BACKGROUND OF THE INVENTION

Typically, when a crank set is installed on a bicycle, the ball bearings of the bottom bracket assembly must be preloaded in order for the crank set to properly function. Preloading the bearings eliminates lateral movement of the crankset and applies a pressure to the bearings of the bottom bracket so that the bearings only move in a wanted direction and do not give in the radial or axial direction. Optimal preloading of the bearings eliminates side-to-side play of the crankset, which may result in a dropped chain, and also prevents the bearings from being too heavily loaded, which decreases the life of the bearings and may cause the crank to seize.

The size of the bottom bracket shell, the bottom bracket, the design of the crank set and/or the design of the crank arms influence how much preload may be required for optimal performance. Consequently, a crank set and bottom bracket assembly is often found as an integrated system including complementary sized components to adapt to the bicycle frame. Additionally, spacers such as elastomer washers or caps which are able to be tightened may be used in order to eliminate play in the crank arms and achieve a proper bearing preload. In either case, properly adjusting the preload of the bottom bracket bearings requires a variety of tools and may require readjustment as the bearings are broken in and play develops within the crank arms and the bottom bracket assembly.

SUMMARY OF THE INVENTION

A system and method eliminates play and adjusts the preload of ball bearings, where two or more bearings are used to support the spindle of a bicycle crank set and in other similar bearing-spindle arrangements. Specifically, a self locking preload adjuster allows for the simple application of bearing preload in order to eliminate the free play of a bearing system without requiring the use of any tools.

In one aspect, a bearing preload adjuster for a bicycle crank set and bottom bracket comprises an adjustment ring for coupling with a bicycle crank arm, a movable plunger comprising an external thread for rotatably coupling with the adjustment ring, and a detent spring. In some embodiments, the bearing preload adjuster is configured to couple with a non-drive side crank arm of the bicycle. In some of these embodiments, the bearing preload adjuster comprises one or more anti-rotation features that are configured to couple with the non-drive side crank arm of the bicycle. In some embodiments, the adjustment ring is rotated in order to move the plunger and apply preload to one or more bearings of the bottom bracket. In some embodiments, the detent spring prevents the movable plunger from backing out once it has been moved in order to apply preload to the one or more bearings of the bottom bracket. In further embodiments, the adjustment ring is only rotatable in a counter-clockwise direction. In some embodiments, the bearing preload adjuster comprises a triple-start thread which is used to apply preload to the bearings. In some embodiments, the bearing preload adjuster comprises a gasket adapted to prevent water and dirt from contacting the one or more bearings of the bottom bracket.

In another aspect, a crank set for a bicycle comprises a drive side crank arm comprising one or more chain rings, a non-drive side crank arm, and an extendable bearing preload adjuster coupled between the non-drive side crank arm and a bottom bracket assembly of the bicycle. In some embodiments, the bearing preload adjuster comprises one or more anti-rotation features that are configured to couple with the non-drive side crank arm of the bicycle. In some embodiments, the bearing preload adjuster is rotated in order to extend a plunger and apply preload to one or more bearings of the bottom bracket. In further embodiments, a detent spring prevents the plunger from backing out once it has been moved in order to apply preload to the one or more bearings of the bottom bracket. In some embodiments, the bearing preload adjuster is only rotatable in a counter-clockwise direction. In some embodiments, the bearing preload adjuster comprises a triple-start thread which is used to apply preload to the bearings. In some embodiments, the bearing preload adjuster further comprises a gasket adapted to prevent water and dirt from contacting the one or more bearings of the bottom bracket.

In a further aspect, a method of preloading one or more bearings of a bicycle bottom bracket comprises coupling a drive-side crank arm and crank spindle with the bicycle, coupling a bearing preload adjuster with a non-drive side crank arm of a bicycle, coupling the non-drive side crank arm with the bicycle, and rotating the bearing preload adjuster in order to extend a plunger along an axis of the crank spindle so that the plunger contacts an inner race of a left bearing and applies a preload force between the left bearing and a right bearing of the bottom bracket. In some embodiments, the bearing preload adjuster is only rotatable in a counter-clockwise direction. In further embodiments, the bearing preload adjuster is locked in place after preload has been applied to the bearings. In some embodiments, the bearing preload adjuster is rotated by hand. In some embodiments, the bearing preload adjuster comprises one or more anti-rotation features that are configured to couple with the non-drive side crank arm of the bicycle

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the invention are directed to a system and method for eliminating play and adjusting the preload of ball bearings, where two or more bearings are used to support the spindle of a bicycle crank set and in other similar bearing-spindle arrangements. Specifically, a self locking preload adjuster allows for the simple application of bearing preload in order to eliminate the free play of a bearing system without requiring the use of any tools.

Figure 1:
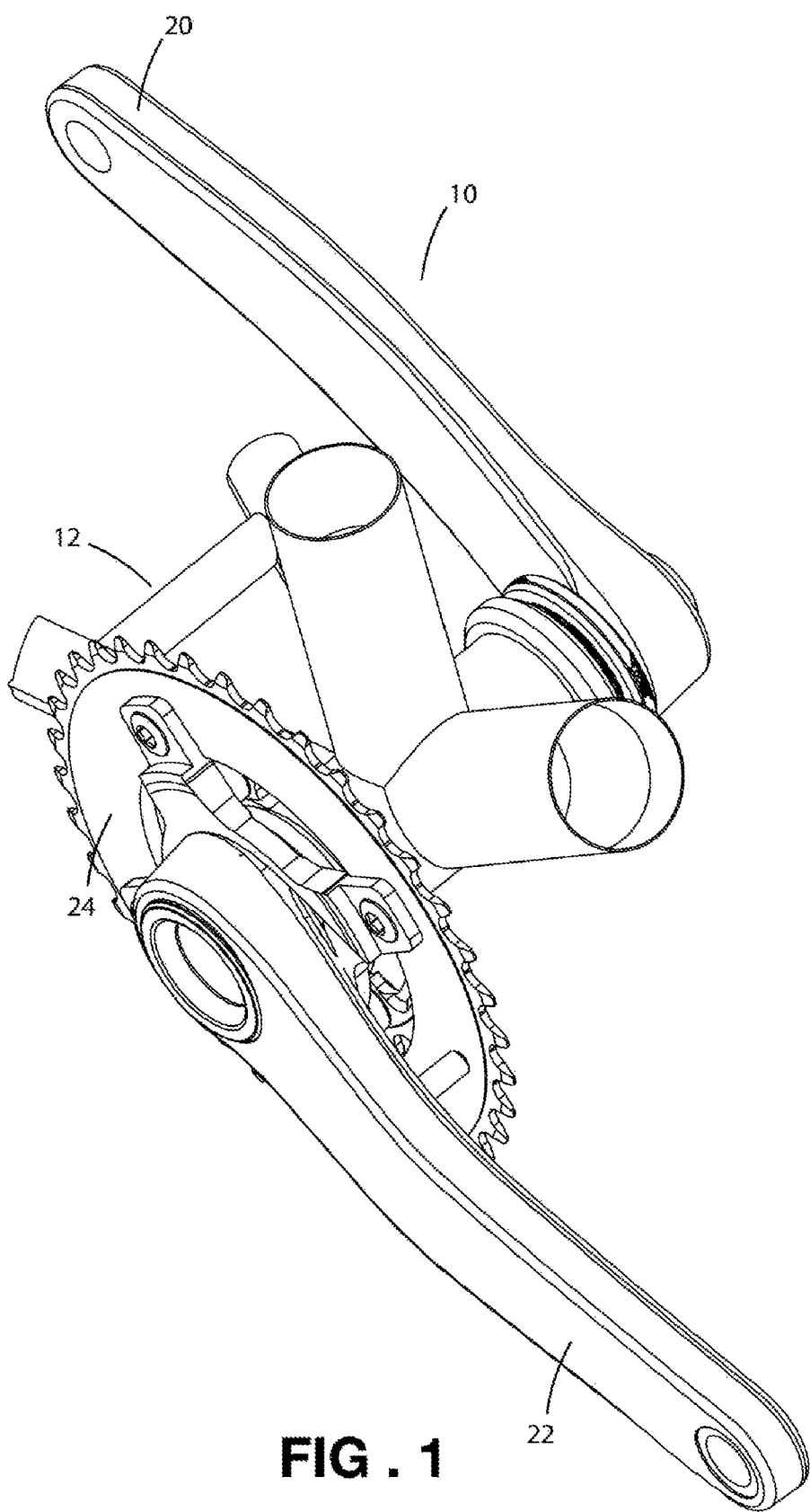
FIG. 1 illustrates an angled view of a crank set assembled to a bicycle frame in accordance with some embodiments.

Referring now to FIG. 1, a bicycle crank set and bottom bracket assembly 10 is shown installed on a bicycle frame bottom bracket assembly 12. The crank set and bottom bracket assembly 10 is shown as cut away from the complete bicycle frame.

Figure 2:
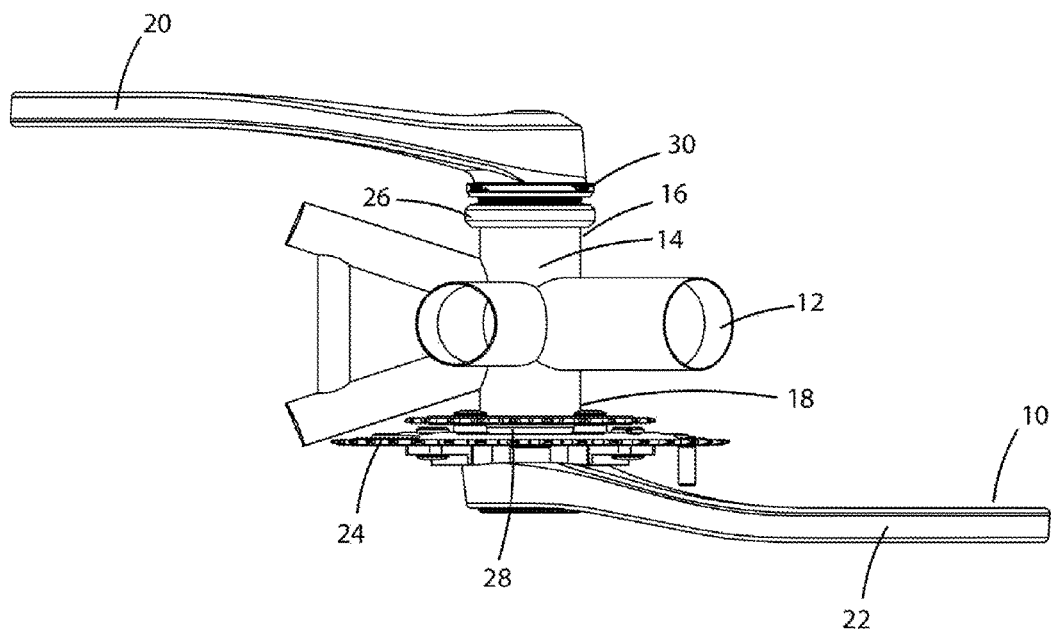
FIG. 2 illustrates a top view of a crank set assembled to a bicycle frame in accordance with some embodiments.
Figure 3:
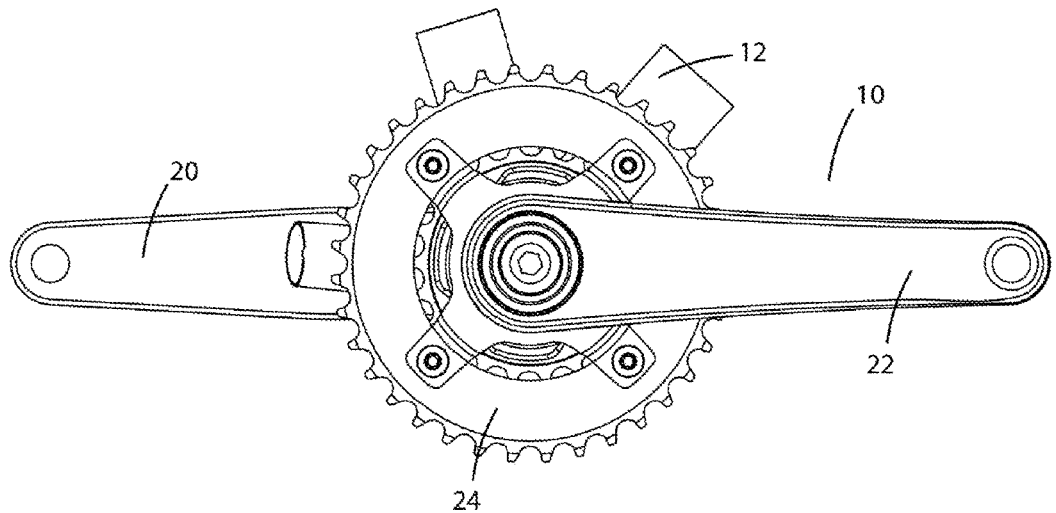
FIG. 3 illustrates a right side view of a crank set assembled to a bicycle frame in accordance with some embodiments.

As shown within FIGS. 2 and 3, the bicycle frame bottom bracket assembly 12 comprises a bottom bracket shell 14, which is composed of a left end 16 and a right end 18. The crank set and bottom bracket assembly 10 includes a left crank arm 20, a right crank arm 22, and one or more chain rings 24. The left crank arm 20 comprises the non-drive side crank arm and the right side crank arm 22 with the one or more chain rings 24 comprising the drive side crank arm.

As shown in FIG. 2, the crank set and bottom bracket assembly 10 also includes a left bottom bracket cup assembly 26, a right bottom bracket cup assembly 28, and a preload adjuster assembly 30.

Figure 4:
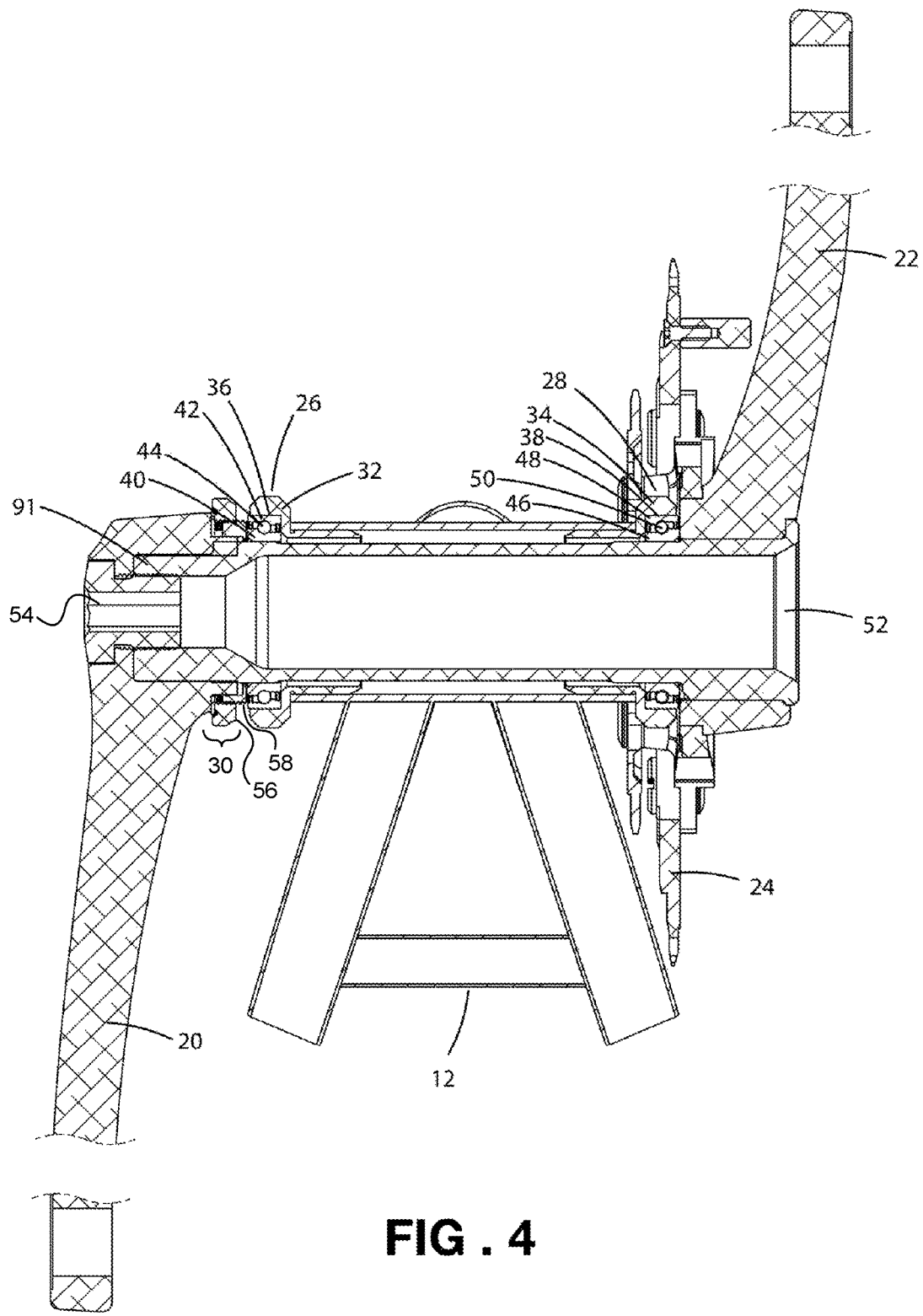
FIG. 4 illustrates a crank set with a preload adjuster installed on a bicycle in accordance with some embodiments.

As shown in the exploded view of FIG. 4, the bottom bracket cup assemblies include a left bottom bracket cup 32 and a right bottom bracket cup 34, a left bottom bracket ball bearing 36 and a right bottom bracket ball bearing 38. The left bottom bracket ball bearing 36 comprises a left inner race 40, a left outer race 42 and a plurality of balls 44 between the left inner race 40 and the left outer race 42. The right bottom bracket ball bearing 38 comprises a right inner race 46, a right outer race 48 and a plurality of balls 50 between the right inner race 46 and the right outer race 48. The bicycle crank set and bottom bracket assembly 10 includes a crank spindle 52, which is rigidly attached to the right arm 22, and a crank fastening bolt 54 which rigidly couples the left crank arm 20 to the crank spindle 52.

Figure 5:
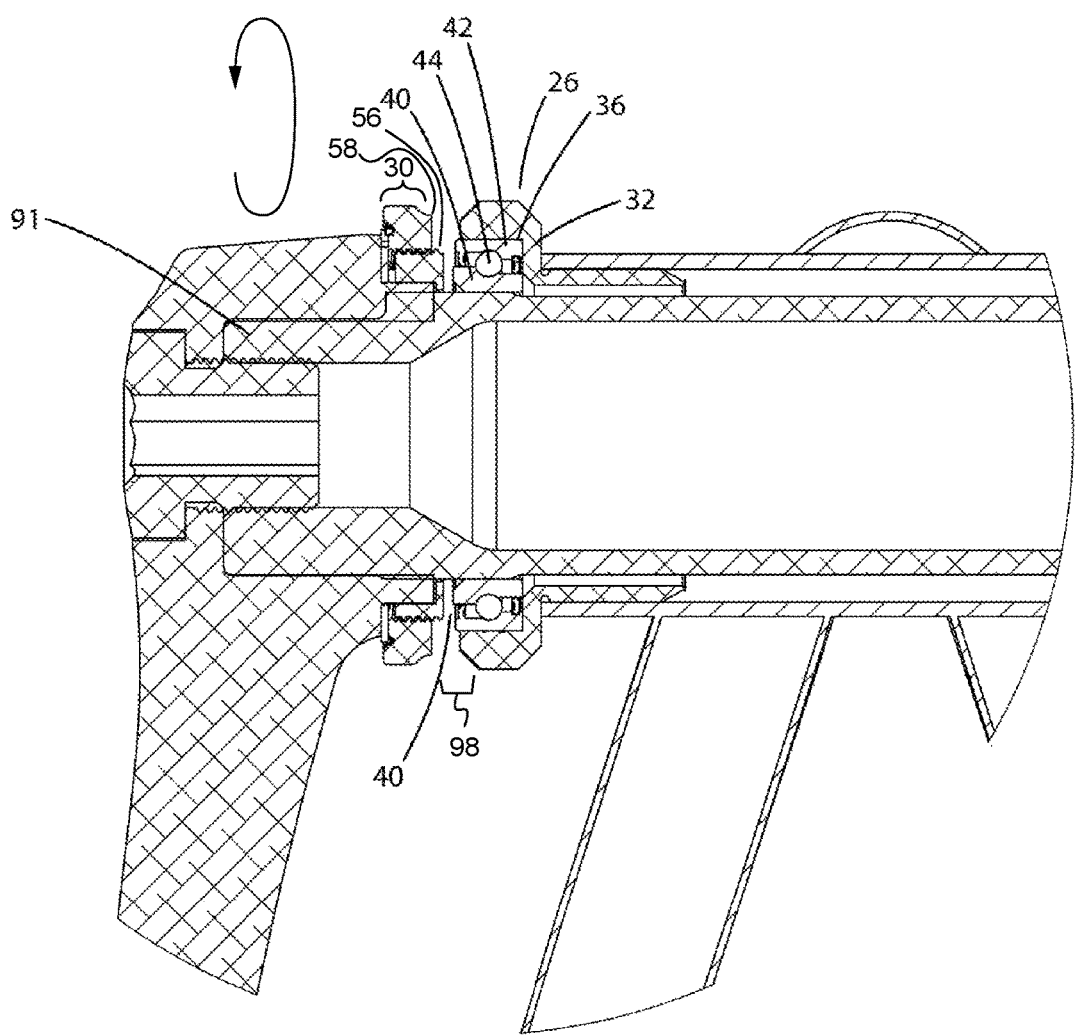
FIG. 5 illustrates a crank set with a preload adjuster section in an open position in accordance with some embodiments.

As shown in FIGS. 4 and 5, the crank spindle 52 is supported radially by the left inner race 40 and the right inner race 46. The right crank arm 22 contacts the right inner race 46 on its right-most surface.

Figure 7:
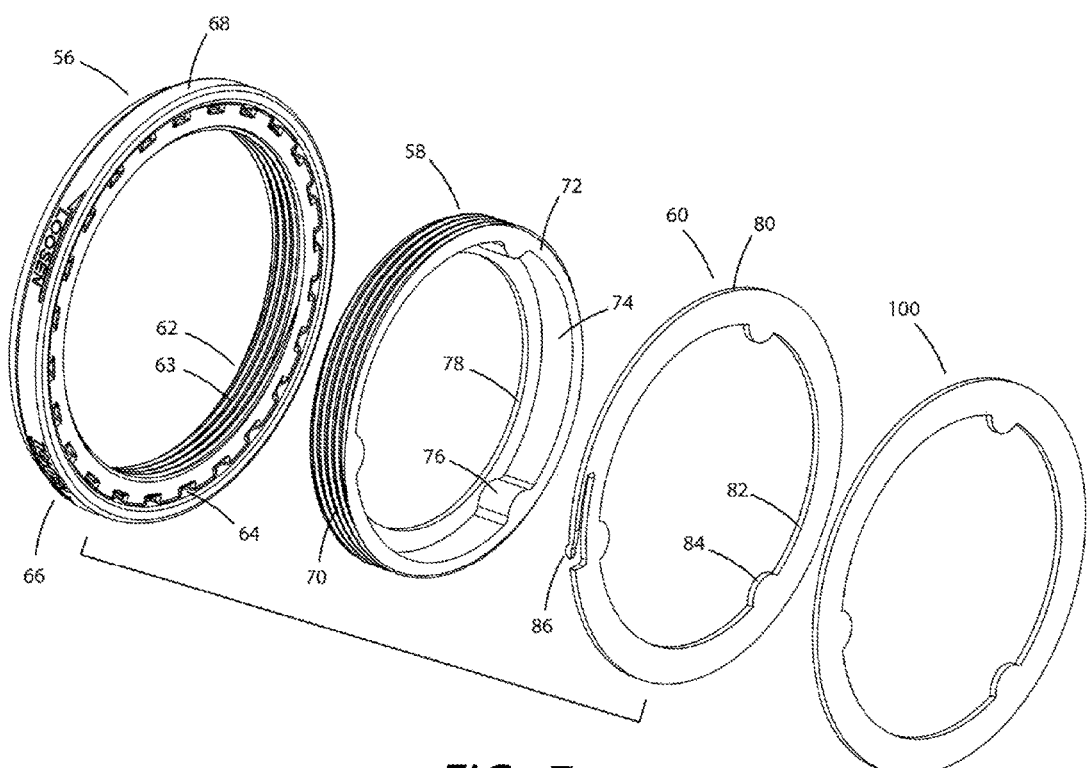
FIG. 7 illustrates an exploded view of a preload adjuster in accordance with some embodiments.

As shown in the exploded view of FIG. 7, a preload adjuster assembly 30 comprises an adjustment ring 56, a plunger 58 and a detent spring 60. The adjustment ring 56 comprises a threaded hole 62, an internal right-hand triple-start thread 63, one or more adjustment ring detent features 64, and an adjustment grip feature 66 on the exterior surface 68 of the adjustment ring 56.

The plunger 58 comprises an external right-hand triple start thread 70, sized to engage the internal right-hand triple start thread 63 of the threaded hole 62. The plunger end 72 comprises a pocket 74, which contains one or more plunger anti-rotation features 76. A spindle clearance hole 78 passes entirely through the center of the plunger 58 to allow the crank spindle 52 to pass through the plunger 58.

The detent spring 60 includes an outer surface 80, a through hole 82, and one or more spring anti-rotation features 84, shaped to match the plunger 58 anti-rotation features 76. The detent spring 60 also comprises one or more detent engagement features 86, sized to engage the adjustment ring 56 detent features 64. Although, the detent spring 60 only includes one detent engagement feature 86, it is contemplated that the detent spring 60 is able to include any number of detent features as appropriately desired. Additionally, the adjustment ring 56 is able to comprise any number of detent features 64 as appropriately desired. Further, in some embodiments, the one or more detent features 64 are able to be located on an exterior surface of the adjustment ring 54. Moreover, in some embodiments, the detent features 64 are located on a face surrounding a root of an adjuster boss 94 (FIG. 9) and part of the left crank arm 20, and the detent engagement feature 86 is a component of the adjustment ring 56 thereby eliminating the need for the detent spring 60. In some embodiments, the detent spring 60 is able to comprise a feature of the crank arm such as a ball-and-spring assembly or spring-and-plunger in order to provide the locking feature of the detent spring 60.

Figure 8:
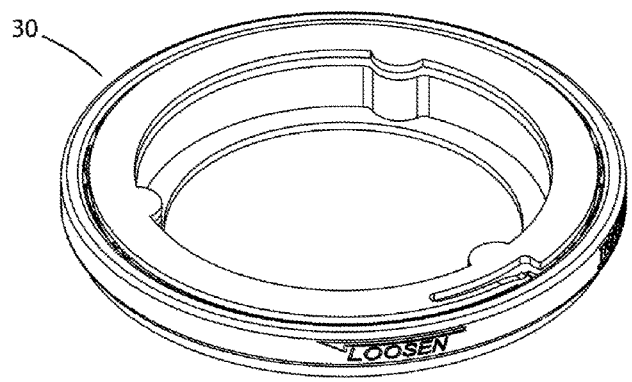
FIG. 8 illustrates an exploded view of a preload adjuster in accordance with some embodiments.

As further shown in FIG. 7, in some embodiments, the preload adjuster assembly 30 comprises a gasket 100 for preventing water, dirt and debris from contacting the bearings of the bottom bracket when the preload adjuster assembly is coupled to the bottom bracket. In some embodiments, the gasket 100 comprises a rubber gasket. In some embodiments, the gasket 100 is a component of the detent spring 60. FIG. 8 illustrates the preload adjuster assembly 30 in an assembled configuration.

Figure 9:
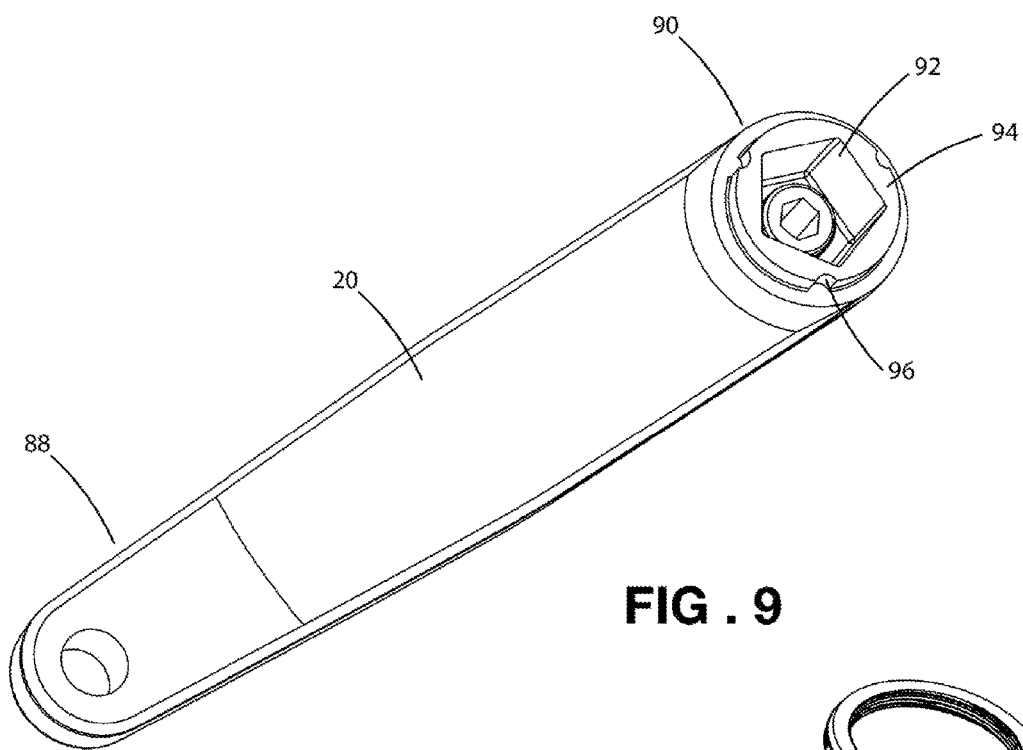
FIG. 9 illustrates a left crank arm without a preload adjuster in accordance with some embodiments.

FIG. 9 shows a left crank arm without a preload adjuster in accordance with some embodiments. As shown within FIG. 9, the left crank arm 20 comprises a pedal end 88 and a left crank spindle end 90. The left crank spindle end 90 comprises a spindle interface 92, sized to receive the spindle left end 91 of the crank spindle 52 (FIG. 4). The left crank spindle end 90 includes an adjuster boss 94, sized to pass through the through hole 82 and into the pocket 74 of the preload adjuster assembly 30. The adjuster boss 94 comprises one or more crank anti-rotation features 96.

Figure 10:
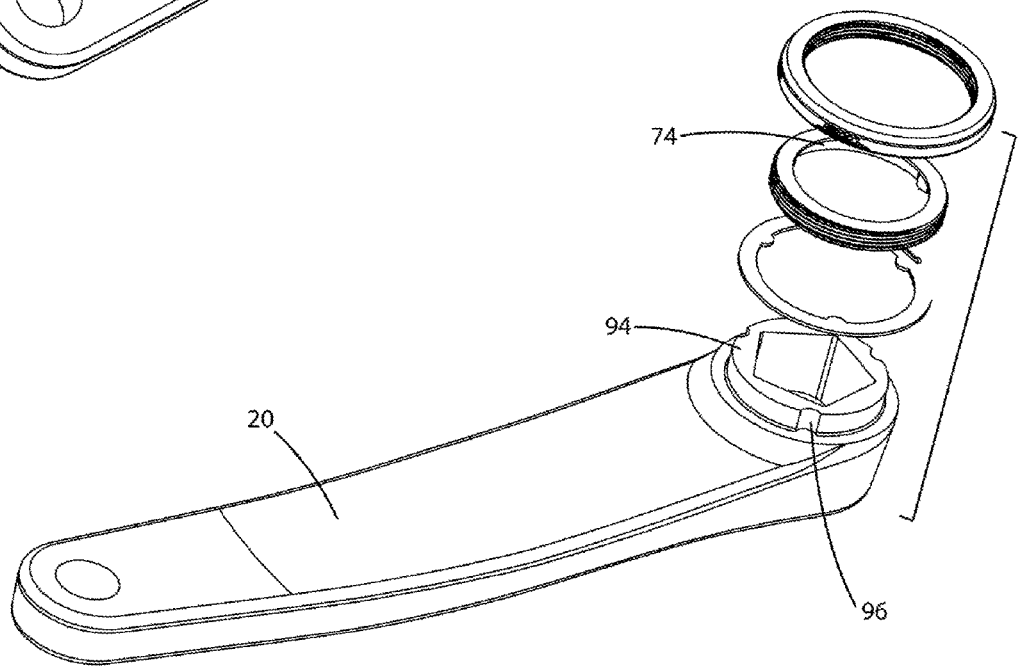
FIG. 10 illustrates a left crank arm with an exploded view of a preload adjuster in accordance with some embodiments.

As shown in the exploded view of FIG. 10, and in the cross section of FIG. 4, the plunger pocket 74 is fitted over the adjuster boss 94, such that the one or more crank anti-rotation features 96 engage with the one or more plunger 58 anti-rotation features 76 and the one or more detent spring 60 anti-rotation features 84.

As described above, the anti-rotation features of the plunger 58, the detent spring 60 and the adjuster boss 94 are able to take the form of a circular shape with a flat portion, a key and key way shape, or a splined inner shape in the plunger 58 and detent spring 60, or any other appropriate anti-rotation feature as known in the art.

As shown in FIG. 4, the left crank arm 20 and the right crank arm 22 are fixed to the crank spindle 52, so that once installed, the crank arms and the spindle 52 rotate as one unit on the left and the right bottom bracket bearings. Once installed and adjusted, the preload adjuster 30 eliminates play in the bearings, allowing the crank assembly to rotate without the bearings sliding side to side.

During installation of the bottom bracket assembly 12, the left bottom bracket cup 32 and the right bottom bracket cup 34 are installed on the bicycle frame. Typically, the bottom bracket cups are press fit or threaded into the frame. Alternatively, in some embodiments, the bearings may be fitted directly into the frame using appropriately sized pockets in the bottom bracket assembly 12.

In some embodiments, the crank spindle 52 is permanently attached to the right crank arm 22. The spindle 52 is passed through the bottom bracket bearings so that the left crank arm interface 92 is able to attach to the spindle left end 91 and the right crank arm 22 presses against the right inner race 46 of the right bottom bracket ball bearing 38.

As described above, the preload adjuster 30 is slid over the adjuster boss 94 of the left crank arm 20 so that the one or more anti-rotation features of the preload adjuster 30 engage with the one or more crank anti-rotation features 96. Then, the left crank arm 20 is attached to the crank spindle 52 by tightening the crank fastening bolt 54. In this position, the preload adjuster assembly 30 is attached to the left crank arm 20, and the left crank arm 20 is attached to the crank spindle 52 by the crank fastening bolt 54. On initial installation, a small gap is present between the plunger 58 and the left inner race 40 of the left bottom bracket bearing 36. The small gap allows for tolerance variations between frames and variations in the dimensions of different bicycle frames and enabling the crank set to be used on a variety of different bicycles.

With the preload adjuster assembly 30 coupled to the bottom bracket assembly 12, the adjustment ring 56 is rotated to further apply a pre-load force between the left bottom bracket ball bearing 36 and the right bottom bracket ball bearing 38. When the adjustment ring 56 is rotated the threaded interface between the adjustment ring 56 and the plunger 58 causes the plunger 58 to extend along the long axis of the spindle 52, away from the left crank arm, so that the plunger 58 contacts the left bearing inner race 42. The adjustment ring 56 is rotated until the clearance in the bearing assemblies and the play in the bottom bracket assembly has been eliminated. This allows the crank assembly to rotate freely, while preventing the crank assembly from sliding side to side inside the bearing bores and along the axis of the crank spindle 52. In some embodiments, the adjustment ring 56 is rotated in a counter-clockwise direction as viewed from an outside edge of the left crank arm 20 in order to extend the plunger 58 to contact the left bearing inner race 42.

Particularly, in some embodiments, the thread between the adjustment ring 56 and the plunger 58 is a right-hand triple start thread. A right-hand thread prevents the adjustment ring 56 from being inadvertently rotated by a processing movement between the left crank arm 20 and the left inner race 40. Precession may occur as a pedaling load is applied to the left crank arm 20 and the crank spindle 52 and the spindle interface flexes. As the left crank arm rotates through 360 degrees, the force between the plunger 58 and the inner race 40 may be un-evenly applied between the two surfaces, which could cause the adjustment ring 56 to rotate if a left-hand thread is used.

Additionally, the detent feature 86 of the detent spring 60 engages with a detent feature 64 of the adjustment ring 56 so that the preload force on the end of the plunger 58 does not cause the adjustment ring 56 to reverse rotation and relieve the preload force under operation. Particularly, the detent feature 86 of the detent spring 60 engages with a detent feature 64 of the adjustment ring 56 in order to lock the plunger in an extended position in order to provide a consistent preload force.

As shown within FIG. 5, the preload adjuster assembly 30 has been installed in the un-loaded position. As described above, and as shown in FIG. 5, on initial installation of the preload adjuster assembly 30, a bearing gap 98 is present between the plunger 58 and the inner bearing race 40 of the left bottom bracket bearing 36. As described above, in some embodiments, the adjustment ring 56 is rotated in a counter-clockwise direction, as indicated by the arrow until the clearance in the bearing assemblies and the play in the bottom bracket assembly has been eliminated.

Figure 6:
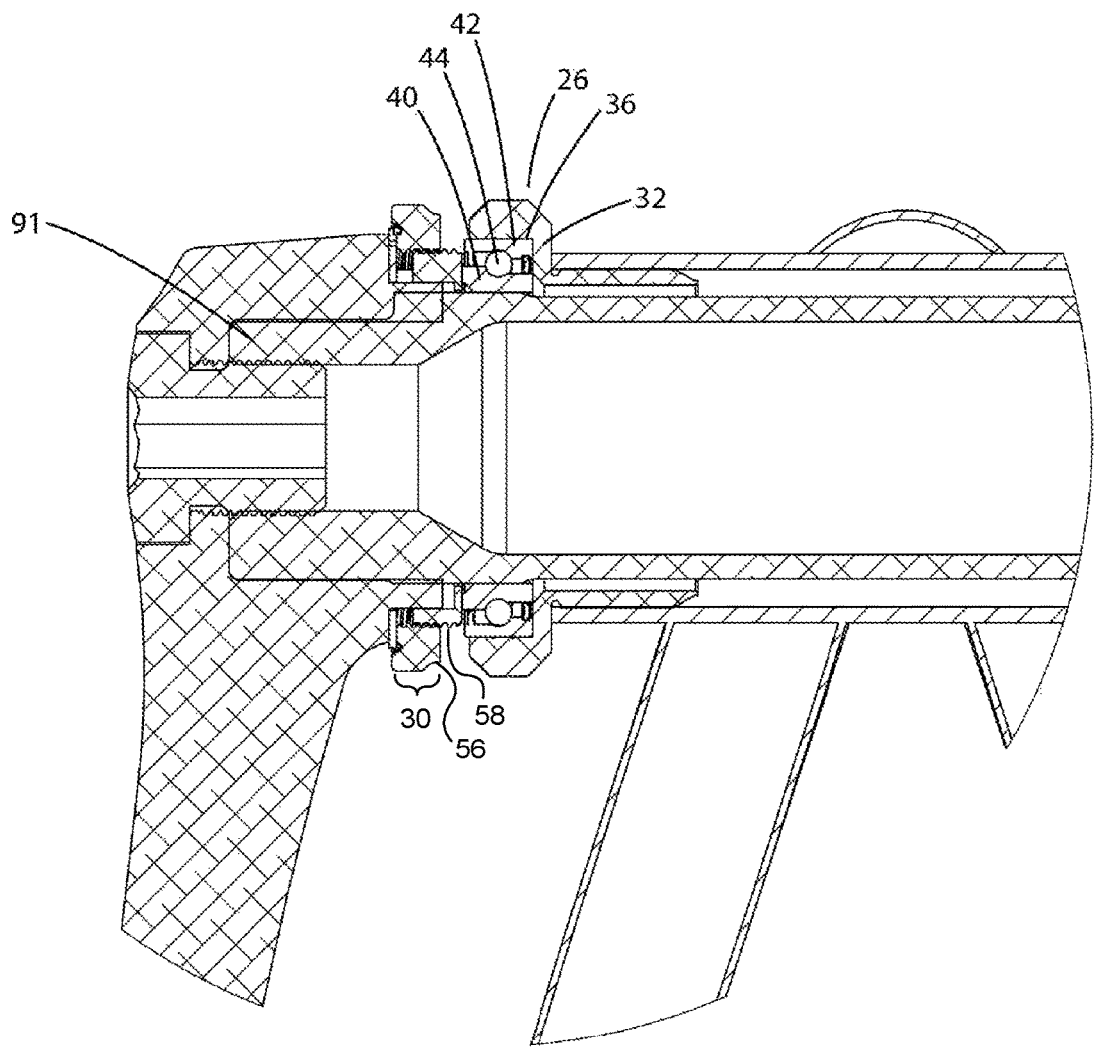
FIG. 6 illustrates a crank set with a preload adjuster section in a closed position in accordance with some embodiments.

FIG. 6 shows the preload adjuster 30 in a closed, preloaded position. The bearing gap 98 has been eliminated by an extension of the plunger 58, and the bearing play in the left bottom bracket bearing 36 and the right bottom bracket bearing 38 has been removed.

Figure 11:
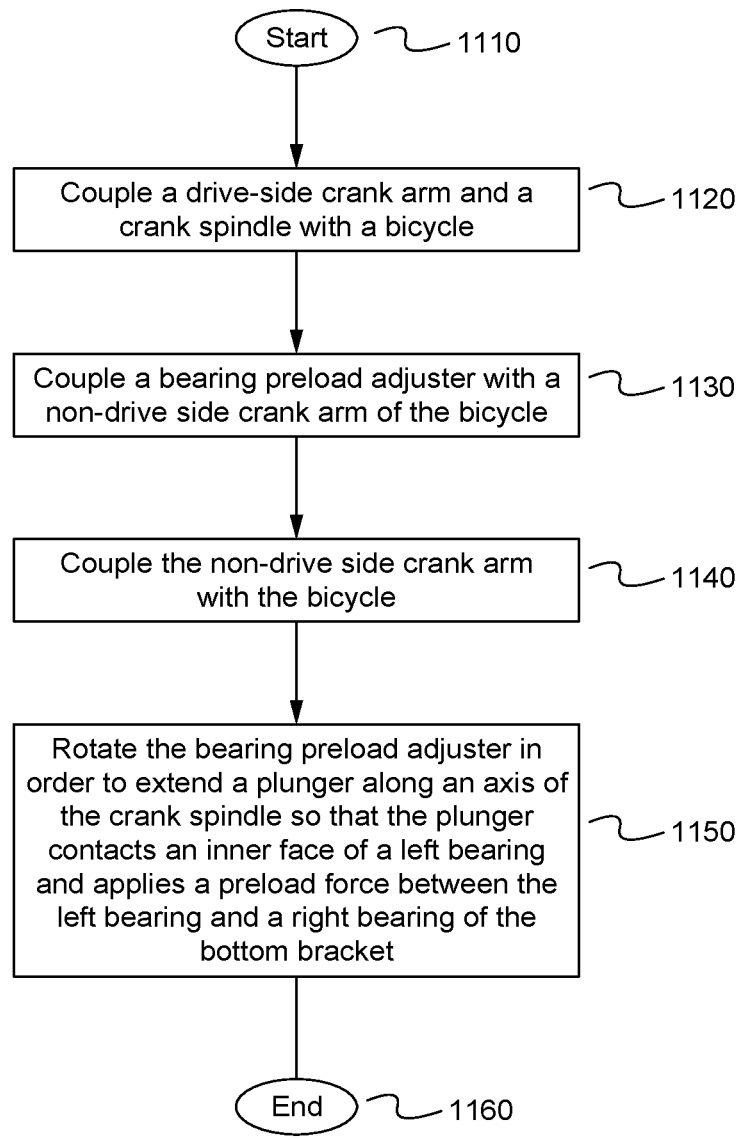
FIG. 11 illustrates a method of preloading one or more bearings of a bicycle bottom bracket in accordance with some embodiments.

FIG. 11 shows a method of preloading one or more bearings of a bicycle bottom bracket in accordance with some embodiments. The method begins in the step 1110. In the step 1120, a drive-side crank arm and crank spindle are coupled with the bicycle frame. As described above, in some embodiments, the crank spindle is passed through the bottom bracket bearings of the bicycle and the drive-side crank arm presses against an inner race of a bottom bracket ball bearing. In the step 1130, a bearing preload adjuster is coupled with a non-drive side crank arm of the bicycle. In some embodiments, the preload adjuster is slid onto the crank arm so that one or more anti-rotation features of the preload adjuster engage with one or more crank anti-rotation features of the non-drive side crank arm. In the step 1140, the non-drive side crank arm is coupled with the bicycle. Then, in the step 1150, the bearing preload adjuster is rotated in order to extend a plunger along an axis of the crank spindle until the plunger contacts an inner race of the bottom bracket bearings of the bicycle. The preload adjuster applies a force between the bearings of the bottom bracket in order to eliminate side-to-side movements of the bearings and eliminate play in the bottom bracket assembly.

In some embodiments, a thread of the preload adjuster is a right-hand triple start thread. Consequently, the bearing preload adjuster is only rotatable in a counter-clockwise direction. In some embodiments, the bearing preload adjuster is locked in place after preload has been applied to the bearings. In some embodiments, the bearing preload adjuster is rotated by hand. Additionally, as described above, in some embodiments, the bearing preload adjuster comprises one or more detent features that are configured to couple with the non-drive side crank arm of the bicycle In use, the bearing pre-load adjuster 30 allows a user to easily adjust the preload of ball bearings used to support the spindle of the bicycle crank set. Particularly, the user is able to couple the pre-load adjuster 30 with the crank set and rotate the adjuster in order to apply preload to the bearings and take the free play out of the system without the use of tools. Particularly, because the system doesn't require any tools for operation, assembly is simplified for the end user. Bearing preload is able to be set using only fingers to adjust the preload mechanism. Additionally, because the adjuster is self-locking, once proper bearing preload is achieved, the preload will not change during operation of the bicycle.

Further, because the bearing pre-load adjuster 30 uses a triple-start thread to apply preload to the bearings, the amount of preload force which can be applied using ones fingers is decreased. Consequently, the bearings will not be overloaded by over-tightening of the preload adjuster. Additionally, the detent feature of the detent spring engages with the detent feature of the adjustment ring and ensures that the preload force on the end of the plunger does not cause the adjustment ring to reverse rotation and relieve the preload force under operation. Accordingly, the presently claimed invention as described herein has many advantages.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A crank set for a bicycle comprising:
   a. a drive side crank arm comprising one or more chain rings;
   b. a non-drive side crank arm;
   c. a spindle;
   d. an extendable bearing preload adjuster fit onto the non-drive side crank arm, wherein the bearing preload adjuster is slid over an adjuster boss of the bicycle crank arm to couple the bearing preload adjuster with the bicycle crank set and a bottom bracket assembly, the extendable bearing preload adjuster comprising:
      i. an adjustment ring;
      ii. a movable plunger comprising an external triple-start thread for rotatably coupling with the adjustment ring; and
      iii. a detent spring, wherein the detent spring includes a spring detent feature that engages within one of a plurality of adjustment ring detent features,
      iv. wherein each of the movable plunger and the detent spring includes a respective at least one anti-rotation feature that engages in an at least one anti-rotation feature of the adjuster boss,
   wherein the adjustment ring is manually rotated to cause the movable plunger to extend along an axis of the bottom bracket assembly inward toward the bottom bracket assembly to apply pressure to a bottom bracket bearing inner race and eliminate a clearance in a bearing assembly of the bottom bracket.

2. The crank set of claim 1 wherein the detent spring prevents the movable plunger from backing out once the movable plunger has been moved in order to apply preload to the bearing assembly of the bottom bracket.

3. The crank set of claim 1 wherein the bearing preload adjuster is rotatable in a counter-clockwise direction.

4. The crank set of claim 1 wherein the bearing preload adjuster further comprises a gasket adapted to prevent water and dirt from contacting the bearing assembly of the bottom bracket.

* * * * *